United States Patent [19]

Anderson

[11] Patent Number: 4,674,672
[45] Date of Patent: Jun. 23, 1987

[54] PROCESS FOR WELDING ALUMINUM ARTICLES

[75] Inventor: Bruce E. Anderson, Traverse City, Mich.

[73] Assignee: AlcoTec Wire Co., Traverse City, Mich.

[21] Appl. No.: 840,151

[22] Filed: Mar. 17, 1986

[51] Int. Cl.$^4$ .............................................. B23K 31/00
[52] U.S. Cl. ........................................ 228/135; 72/42
[58] Field of Search .................... 228/135, 118; 72/42; 29/159.1

[56] References Cited

U.S. PATENT DOCUMENTS

| | | | |
|---|---|---|---|
| 3,222,765 | 12/1965 | Parent et al. | 29/159.1 |
| 4,052,323 | 10/1977 | Feneberger et al. | 72/42 |
| 4,201,070 | 5/1980 | Seaton et al. | 72/42 |
| 4,281,528 | 8/1981 | Spiegelberg et al. | 72/28 |
| 4,541,984 | 9/1985 | Palmer | 376/415 |

FOREIGN PATENT DOCUMENTS 0117364  9/1979  Japan ...................................... 72/42

Primary Examiner—Nicholas P. Godici
Assistant Examiner—Karen Skillman
Attorney, Agent, or Firm—Glenn E. Klepac

[57] ABSTRACT

Metal articles are press-fitted together, using a lubricant dispersion comprising about 1–15 wt % colloidal graphite in isopropanol. The isopropanol is removed and the articles are then welded together at a joint to form a unitary weldment. The process is especially suitable for use on articles made from aluminum and aluminum alloys.

19 Claims, 1 Drawing Figure

U.S. Patent    Jun. 23, 1987    4,674,672
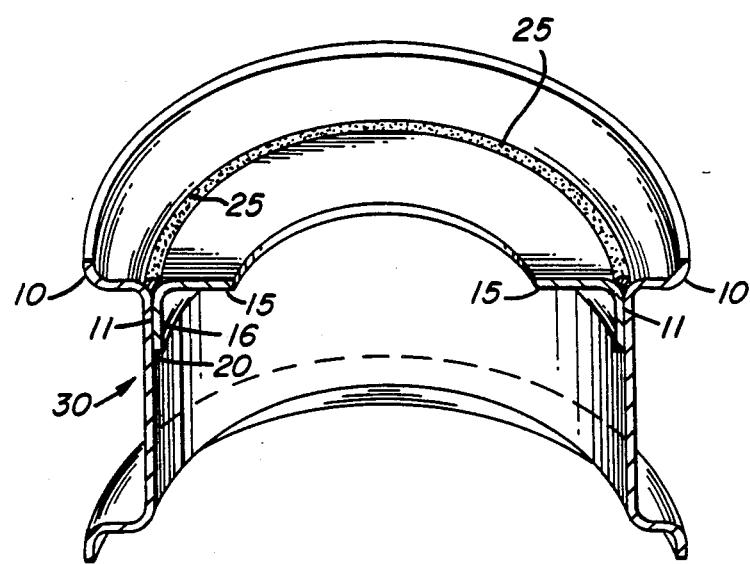

PROCESS FOR WELDING ALUMINUM ARTICLES

FIELD OF THE INVENTION

The present invention relates to a process for welding metal articles together and more particularly to an improved process for welding aluminum or aluminum alloy articles which are press-fitted before being welded.

BACKGROUND OF THE INVENTION

The welding of aluminum articles requires specialized processes to provide high quality weldments. More particularly, a welded joint between aluminum articles must possess strength and ductility. Strength is needed to hold the welded joint together, and ductility is necessary to permit plastic deformation without fracture. Strength and ductility are effected by four major factors: alloy composition, oxide contamination, porosity, and weld penetration.

In the prior art, articles made of metals other than aluminum are generally lubricated with mineral oil compositions before they are press-fitted together. The fitted articles can then be welded satisfactorily to form a unitary weldment.

When aluminum parts are to be welded, they must be thoroughly cleaned to remove all traces of lubricants in order to avoid hydrogen porosity problems caused by the lubricant. However, if forming or mating operations such as press-fitting are required prior to welding, both mating parts are traditionally cleaned and assembled in the as-cleaned condition in order to avoid interference by a lubricant with the subsequent welding operation. When an interference fit is required, this causes galling and scratching of the parts. Consequently, procedures such as heat-fitting and shrinkage-fitting are commonly employed.

It is a principal objective of the present invention to provide a process for press-fitting together aluminum articles which must subsequently be welded, wherein the articles are lubricated with a dispersion of colloidal graphite prior to press-fitting.

A related object of the present invention is to provide a lubricant composition that avoids hydrogen porosity in welded joints of aluminum articles which are press-fitted together and subsequently welded.

Additional objects and advantages of the present invention will become apparent to persons skilled in the art from the following detailed description.

SUMMARY OF THE INVENTION

In accordance with the present invention, colloidal graphite is dispersed in a sufficient quantity of isopropanol to form a lubricant or lubricant composition comprising a colloidal dispersion. The composition generally comprises about 1–15 wt % colloidal graphite in isopropanol. Compositions containing about 2–8 wt % colloidal graphite are preferred. A particularly preferred dispersion comprises about 5 wt % colloidal graphite. Alternatively, the lubricant consists essentially of a colloidal dispersion of about 1–15 wt % colloidal graphite in isopropanol. The dispersion preferably consists of colloidal graphite and isopropanol.

The colloidal dispersion is applied onto a surface portion of a first metal article. The surface portion is frictionally abutted against a surface portion of a second metal article, thereby to form a joint. The metal articles are then either heated or allowed to stand in order to remove isopropanol from the joint by evaporation, with colloidal graphite remaining. The articles are then welded together at the joint to form a unitary weldment.

Colloidal graphite particles in the dispersion preferably have an average particle size of less than about 10 microns. Average particle sizes of about 0.1–2 microns are especially preferred. An average particle size of about 1 micron is quite suitable.

The process of the invention is most suitable applied to metal articles made from aluminum or an aluminum alloy. The process finds its greatest utility on articles made from aluminum alloys of the 5000 or 6000 series.

The first metal article preferably comprises a generally concave inner surface portion which is usually generally cylindrical in shape. The second metal article has a generally convex outer surface portion which is also usually generally cylindrical in shape. The inner surface portion of the first article is usually generally coextensive with the outer surface portion of the second article.

BRIEF DESCRIPTION OF THE DRAWING

The sole FIGURE is a cross-sectional view of a weldment made in accordance with the process of the present invention.

DETAILED DESCRIPTION OF A PREFERRED EMBODIMENT

The process of the present invention is useful for welding together a first aluminum or aluminum alloy article 10 having a generally concave inner surface portion 11 with a second aluminum article 15 having a generally convex outer surface portion 16. The inner surface portion 11 and outer surface portion 16 are each preferably generally cylindrical and generally coextensive with one another.

In one preferred embodiment of the invention, the first article 10 comprises a wheel rim made from an aluminum 5554 alloy. The second article comprises a web or wheel web made from an aluminum 5554 alloy. The first article 10 and second article 15 are joined together to form an aluminum alloy wheel assembly.

In another preferred embodiment, the first article 10 comprises a ring made from an aluminum 6061 T6 alloy, and the second article comprises an end panel made from an aluminum 6061 T6 alloy. The two articles are joined together to from an end panel assembly for a bulkhead end of a tanker truck trailer.

A process of the invention is preferably carried out by shaking a container holding a 5 wt % dispersion of colloidal graphite (average particle size about 1 micron) to insure homogeneity. The dispersion is then applied onto an inner surface portion 11 of a first article 10 by spraying from a spray bottle. A second article 11 is then press-fitted into the first article 10 to form a joint 20 between the inner surface portion 11 and outer surface portion 16.

Isopropanol is then removed from the joint 20 by heating or evaporation over a long period of time.

The press-fitted articles 10, 15 are next welded together, with a weld bead 25 forming above the joint 20. The articles can be welded by electric arc welding or other preferred welding means. A completed weldment or weld assembly 30 is shown in the FIGURE.

The colloidal graphite dispersion of the invention is also useful for high pressure forming of aluminum articles which are later to be welded. An example of one such use is in manufacture of the truck bulkhead referred to above, which includes a domed end panel having a curled lip on an outer edge portion.

The process of the present invention allows aluminum articles to be cleaned, lubricated, and assembled without galling or scratching. Colloidal graphite trapped between mating articles has no adverse effect on subsequent welding operations.

Weldments made in accordance with the present invention are free from hydrogen porosity because the colloidal graphite, unlike mineral oil, does not decompose in the presence of an arc to emit hydrogen. Graphite is stable at arc temperatures.

The graphite lubricant is a conductor and promotes arc stability. During arc initiation, the lubricant improved contact and ease of striking the arc.

Because the colloidal graphite is insoluble in molten aluminum, it forms no detrimental compounds and is ejected from the molten metal prior to solidification. Consequently, the lubricant leaves no foreign material in the weld to act as a stress riser.

The colloidal-graphite isopropanol dispersion has an excellent lubricating capability through a wide range of temperatures. If elevated temperature forming or assembly are required, the lubricant remains chemically stable.

The graphite dispersion also forms a coating which acts as a barrier layer between the aluminum article and the atmosphere. This barrier layer improves the length of time a part can be exposed to the atmosphere and still retain proper welding characteristics.

The foregoing detailed description of my invention has been made with reference to some preferred embodiments. Persons skilled in the art will understand that considerable modifications and changes can be made therein without departing from the spirit and scope of the following claims.

What is claimed is:

1. A process for welding aluminum and aluminum alloy articles together, comprising the steps of:
   (a) dispersing colloidal graphite in a sufficient quanity of isopropanol to form a colloidal dispersion consisting essentially of about 1-15 wt % colloidal graphite in isopropanol;
   (b) lubricating a surface portion of a first aluminum or aluminum alloy article by applying said colloidal dispersion thereto;
   (c) frictionally abutting said surface portion against a surface portion of a second aluminum or aluminum alloy article, thereby to form a joint;
   (d) removing the isopropanol from the joint; and
   (e) welding the first and second articles together at the joint to form a unitary weldment.

2. A process claimed in claim 1 wherein the dispersion consists essentially of about 2-8 wt % colloidal graphite in isopropanol.

3. A process as claimed in claim 1 wherein the dispersion consists essentially of about 5 wt % colloidal graphite in isopropanol.

4. A process as claimed in claim 1 wherein said colloidal graphite has an average particle size of less than about 10 microns.

5. A process as claimed in claim 1 wherein the average particle size of the colloidal graphite is about 0.1-2 microns.

6. A process as claimed in claim 1 wherein said first article and said second article each comprise an aluminum alloy of the 5000 or 6000 series.

7. A process as claimed in claim 1 wherein said first metal article comprises an aluminum alloy wheel rim having a generally concave inner surface portion, said second metal article comprises an aluminum alloy web having a generally convex outer surface portion, said inner surface portion of the rim being generally coextensive with the outer surface portion of the web, and wherein step (c) comprises press-fitting said web into frictional abutment with said rim to form a wheel assembly.

8. A process as claimed in claim 7 wherein said inner surface portion and outer surface portion are each generally cylindrical.

9. A process as claimed in claim 1 wherein said first metal article comprises an aluminum alloy ring having a generally concave inner surface portion, said second metal article comprises an aluminum alloy end panel having a generally convex outer surface portion, said inner surface portion of the ring being generally coextensive with said outer surface portion of the end panel, and wherein step (c) comprises press-fitting said end panel into frictional abutment with said ring to form an end panel assembly.

10. A process as claimed in claim 8 wherein said inner surface portion and outer surface portion are both generally cylindrical.

11. In a process for welding aluminum or aluminum alloy articles comprising the steps of:
   (a) frictionally abutting a generally convex outer surface portion of a second aluminum or aluminum alloy article against a generally concave inner surface portion of a first aluminum or aluminum alloy article, thereby to form a joint between the articles; and
   (b) welding the first and second articles together at the joint to from a unitary weldment; the improvement comprising
   (c) lubricating either the inner surface portion or outer surface portion by applying thereto a lubricant consisting essentially of a colloidal dispersion of about 1-15 wt % colloidal graphite in isopropanol prior to step (a) and then removing the isopropanol prior to step (b), thereby avoiding entrapment of residual hydrocarbons in the joint during step (b).

12. A process as claimed in claim 11 wherein said lubricant consists essentially of about 2-8 wt % colloidal graphite dispersed in isopropanol.

13. A process as claimed in claim 11 wherein said lubricant consists essentially of about 5 wt % colloidal graphite dispersed in isopropanol.

14. A process as claimed in claim 11 wherein said colloidal graphite has an average particle size of less than about 10 microns.

15. A process as claimed in claim 11 wherein the average particle size of the colloidal graphite is about 0.1-2 microns.

16. A process as claimed in claim 11 wherein said first and second articles each comprise an aluminum alloy of the 5000 or 6000 series.

17. A process as claimed in claim 11 wherein said inner surface portion and outer surface portion are each generally cylindrical and generally coextensive, and wherein step (a) includes press-fitting the articles together so that said inner surface portion abuts said outer surface portion.

18. A process as claimed in claim 1 wherein said dispersion consists of colloidal graphite and isopropanol.

19. A process as claimed in claim 11 wherein said dispersion consists of colloidal graphite and isopropanol.

* * * * *